Nov. 25, 1969  E. E. ZIEGLER  3,479,779
COMPOSITE CONSTRUCTION PANEL
Filed May 2, 1968
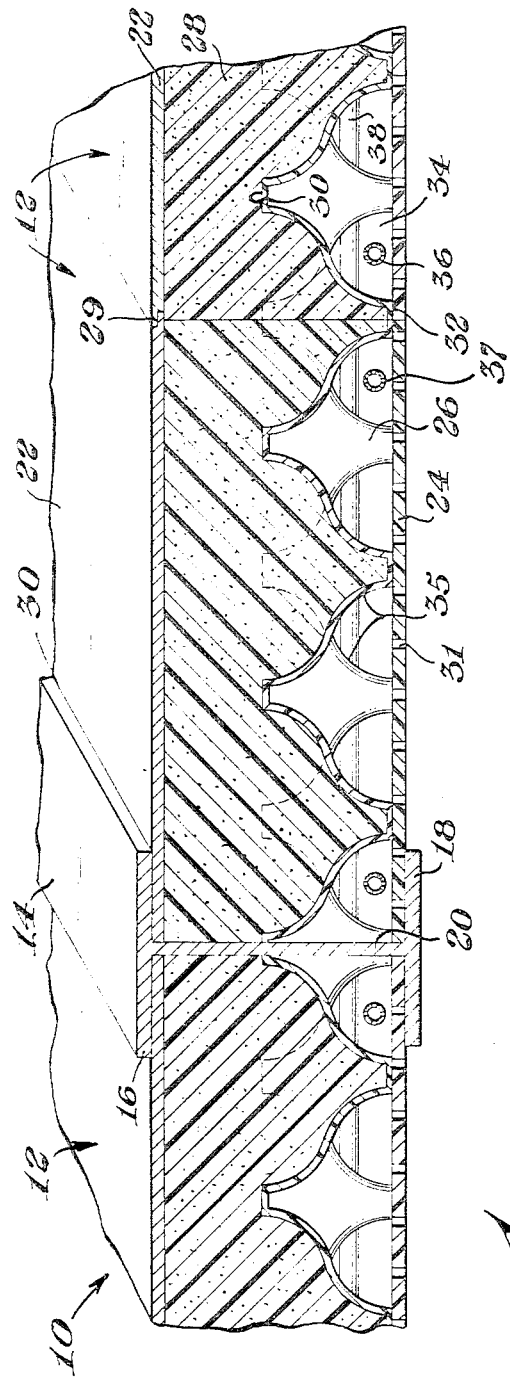
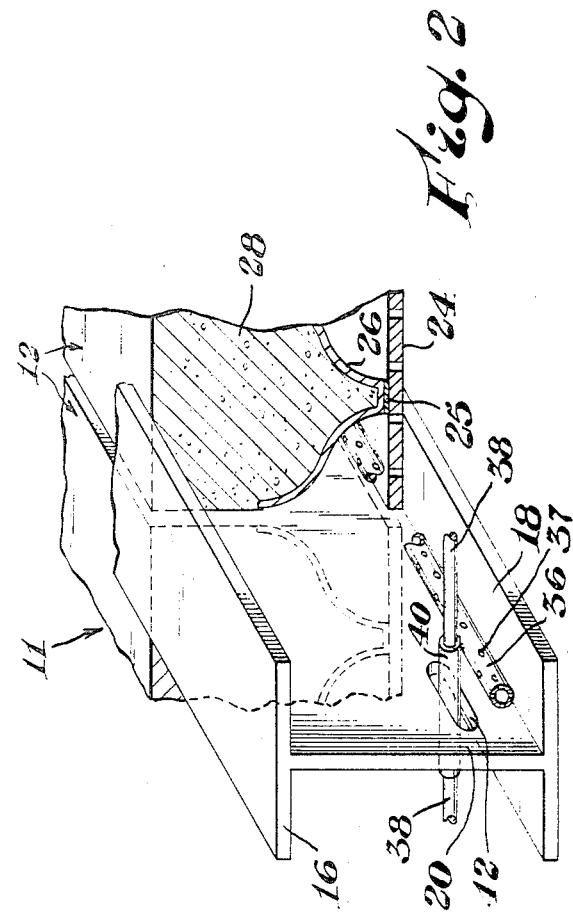
INVENTOR.
Earl E. Ziegler
BY
L. E. Hessemann J.
ATTORNEY United States Patent Office 3,479,779
Patented Nov. 25, 1969

3,479,779
COMPOSITE CONSTRUCTION PANEL
Earl E. Ziegler, Midland, Mich., assignor to The Dow Chemical Company, Midland, Mich., a corporation of Delaware
Filed May 2, 1968, Ser. No. 726,144
Int. Cl. E04b *1/82, 5/48;* E04c *2/52*
U.S. Cl. 52—144                                     3 Claims

ABSTRACT OF THE DISCLOSURE

A composite construction panel for use in walls, roofs or floors of buildings. Such panels can be completely prefabricated and can be installed simply and in a dry system. Between the skins of the panel is located a reinforced core structure, which core structure is substantially saddle shaped and provides continuous passageways for duct work and conduits. Also forming part of the composite panel is a thermal insulating and/or rigid reinforcing filler material which extends between one of the skins and one surface of the core structure to provide desirable insulation and strength characteristics to the panel.

---

It has been a problem in the construction industry to design and build a multi-functional prefabricated panel capable of fast erection at a relatively low cost. Such a panel should provide for heating, cooling, acoustical absorption, fire proofing, and have load bearing and insulation properties, as well as provide conduit passageways. To have full utility, the panel should also be one which is capable of being installed simply and in a completely dry system.

Accordingly, it is an object of the present invention to provide a novel composite construction panel which can be used as part of a wall, roof or floor of a building. It is a more specific object to provide a panel which is multipurpose so as to provide structural strength to and insulation for the building as well as provide a housing for electrical and fire extinguishing elements and be capable of assisting in the temperature control of the space confined by the panel. In addition, it is an object to provide a panel having the above advantages and which can be readily and simply installed in a dry system.

Briefly, considering the panel to be adapted to a roof structure as an example, the present invention comprehends a composite construction panel having upper and lower skins. Between the skins is located a reinforcing substantially saddle shaped core structure providing straight through passageways for ducts and conduits as well as lending structural strength to the panel. The core structure should be located adjacent the lower skin. The lower skin is preferably perforated to provide fluid passageways for air conditioning and fire extinguishing systems and for sound to travel therethrough into the panel to be diffused and absorbed by the configuration of the core structure therewithin. The lower skin can be decoratively embossed or otherwise textured to act as an acoustics absorber. Located between the top surface of the core structure and the upper skin is a filler material such as a plastic foam or a concrete material which can serve as an insulator and/or reinforcement for the panel composite.

Yet additional objects and advantages of the present invention are even more apparent when taken in conjunction with the accompanying drawing in which like characters of reference designate corresponding material and parts throughout the several views thereof, in which:

FIGURE 1 is a fragmentary isometric view showing in cross section a roof structure employing a composite construction panel embodying the principles of the present invention; and FIGURE 2 is a view like FIGURE 1 of a modified structure and with portions of the panel broken away to show the duct work and conduits in more detail.

Referring particularly to the drawing, there is shown a roof or building structure 10 comprised of a plurality of prefabricated composite construction panels 12. Panels 12 can be supported by an I-beam 14 having upper and lower horizontal flanges 16 and 18, respectively, and a vertical web 20 extending therebetween. Panels 12 adjacent I-beam 14 are of a height which is sufficient to fit within and between flanges 16 and 18 so that they can be carried and supported thereby. Preferably they fit substantially flush against vertical web 20.

Each panel 12 comprises an upper skin 22, which can be the roof or building exterior, and a lower skin 24, which can be the ceiling or building interior. Shown resting on and attached to skin 24, by an epoxy adhesive 25 or by spot welding, for example, is a core structure 26. Core structure 26 can extend less than the entire vertical distance between skins 22 and 24, being shown in the drawing as extending about one half that distance. However, skin 22 can be located across the top of core structure 26 if this is desired for a particular application. Filling the space between the core 26 and skin 22 is a filler material 28, which is secured, by well known epoxy adhesives or by the inherent adhesive characteristic thereof, or the like, to the skin 22 and core 26.

Skin 22 can be formed of metal, wood, concrete, gypsum, stucco, galvanized or porcelainized sheet steel, anodized sheet aluminum, or other weather-proof materials such as a chlorinated polyethylene sheet, any of which should be capable of fast and permanent attachment to adjacent panels, as for example, by welding or sealing of an overlapping joint 29, as is typically illustrated in FIGURE 1. If desired, a sealing compound, such as asphalt, can be located at juncture 30 between the flange 14 and skin 22, if needed or desired. It is also conceivable, particularly in a roofing or flooring application, that the outer surface of filler material will have sufficient wearing qualities of its own, thereby not requiring a separate outer skin 22, as illustrated in the modification of FIGURE 2. If the outside of a roof, it can be considered finished as is. Optionally, it can be waterproofed in a conventional manner by a tar paper, asphalt application. This would be desirable also where a skin 22 is employed, particularly if it were wood or the like.

Lower skin 24 can be formed of a perforated metal sheet (such as steel or aluminum), thermoplastic sheet (such as polyvinyl chloride or acrylonitrile styrene butadiene sheet), cement asbestos sheet, or the like. Preferably there is an extensive number of perforations 31 throughout the skin 24 so that sound from the interior of the building can pass readily into the panel and be diffused and absorbed by structure 26. Skin 22 can also be decorated, if desired, in a manner so as not to cover perforations 31. Such decoration can be additional layers (not shown) of fabric or other material laminated to the skin 24 or can comprise embossments on the skin itself to provide the interior finish and acoustical properties needed.

Core structure 26 is formed of a generally saddle shaped sheet having spaced and offset projections on opposite sides joined by generally sinusoidal shaped portions of the sheet and can take several different forms as described, for example, in U.S. Patent No. 3,277,598, the disclosure of which is here by reference incorporated in its entirety. The core structures can be constructed of a self-supporting thermoplastic or thermosetting sheet material such as polystyrene, polyvinyl chloride, high density rigid urethane foam, epoxy or glass fiber reinforced polyesters, or a metal sheet material such as galvanized steel or anodized aluminum sheet, or a cement asbestos or latex modified concrete sheet material. Such a core structure provides upper and lower nodes 30 and 32, respectively, the lower nodes 32 being adhered to the inner surface of skin 24 by an adhesive 25, or by spot or heat welding, depending on the materials of the core structure 26 and skin 24.

Between spaced nodes 32 is formed an arch or opening 35 rendering straight through archways 34 through which ducts 36 or conduits 38 or other service elements can pass. These ducts can be formed of a light gauge polyvinyl chloride resin or metal tubing, for example, which can be connected from one panel to another by a coupling 40, and which can be perforated by holes 37 to carry and/or circulate hot or cold air, carbon dioxide or water for fire extinguishment, about the interior of the building, the fluids passing through holes 37 and out perforations 31 into the building interior and, vice versa, where applicable. Conduit 38 can carry electrical wire. In FIGURE 2 it can be seen how a conduit 38 passing through panel 12 can be connected by flexible rubber hose or plastic or metal sleeve coupling 40, through an opening 42 in the web 20 of I-beam 14, to another like conduit 38 on the other side of the I-beam. Ducts 36 can be similarly connected.

Filler material 28 is provided above the core 26 between the upper portion thereof and skin 22 in the embodiment of FIGURE 1 to provide insulation and/or mass and strength, particularly the latter when such filler material comprises something like a regular or latex modified concrete material, for example. If insulation is what is most important and mass and strength are not as critical, a polyurethane foam or polystyrene foam, for example, can comprise the filler material 28. When a more massive material, such as concrete, is employed, there may be instances where skin 22 can be eliminated, as illustrated in FIGURE 2.

To further illustrate the wide range of applications of the present invention, a composite construction panel similar to panel 10 could be employed, for example, as either (a) a thin light-weight curtain wall construction where the skin 22 is the finished exterior surface of the wall and the skin 24 is the finished interior surface of the wall or, in contrast, as (b) a heavy load bearing warehouse floor where the top of the panel is the wearing surface of an upper floor and the bottom of the panel is the ceiling of the next lower floor.

In the curtain wall application (which is more like FIGURE 1), the panel 10 can have an overall thickness of only 4 inches. Skin 24 need be of only $\frac{1}{32}$ inch thick polyvinyl chloride sheet, perforations 31 being included or excluded depending on whether such are acceptable from an aesthetic viewpoint as an interior vertical side wall finish. Core structure 26 can comprise a $\frac{1}{16}$ inch thick polyvinyl chloride sheet having a node to node depth of about 3 inches. Filler material 28 can comprise a formed-in-place polyurethane foam and skin 22 can comprise a 20 gauge anodized aluminum sheet.

In the case of the warehouse floor (which is more like FIGURE 2), the panel 11 can be about 1½ feet thick, with skin 24 being of 16 gauge sheet steel and having ⅛ inch diameter perforations located at a ¼ inch center to center spacing from one another. The core structure 26 can be comprised of ⅛ inch thick sheet steel and have a vertical node to node depth (vertical distance between planes passing across oppositely disposed nodes 30 and 32, respectively) of about 9 inches. Filler material 28 can comprise a latex modified concrete extending from the upper surface of core structure 26 to the rest of the height of the panel. Because the filler material in and of itself is an excellent wearing surface, an upper skin 22 is not included.

An advantage of the composite construction panel of this invention is that it can be installed in a completely dry system because there is no need to undertake painting, plastering or mortaring of the interior surface of the panel.

It is understood that the composite structure panel described can be used in curtain walls, dropped ceilings and in floor combinations as well as in the roof structure specifically shown in the drawing. Thus, while certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A building structure having a wall, ceiling, or floor formed of a plurality of adjacent panels, each of said panels being a composite prefabricated panel comprising a pair of skins forming opposite surfaces thereof, a core structure adjacent to at least one of said skins and secured thereto, an insulating foam filler material extending from the surface of said core structure opposite from said one skin to the other of said skins, said filler material being secured to opposed surfaces of said core structure and said other skin, said core structure comprising a sheet-like member having spaced projections on opposite sides thereof, the projections on one side being offset from the projections on the opposite side, the portions of the sheet joining the offset projections on opposite sides of the sheet being generally sinusoidal shaped in at least part of its cross-section, said core structure defining continuous archways through the panel from edge-to-edge of said panel inwardly of said one skin, service elements supplementing the function of said panel carried in said archways, selected adjoining edges of adjoining panels being joined in interengaging relationship and other adjoining edges of some adjoining panels being supported by structural support members, and means coupling said service elements of adjacent panels to one another, said service elements traversing at least one of said structural support members.

2. The structure of claim 1 wherein said core structure is formed of a self-supporting plastic material.

3. The structure of claim 1 wherein the skins adjacent the archways are perforated sufficiently to permit ready passage of fluids.

References Cited
UNITED STATES PATENTS

| | | | |
|---|---|---|---|
| 278,491 | 5/1883 | Black | 169—16 |
| 1,833,143 | 11/1931 | Weiss | 52—145 |
| 2,007,689 | 7/1935 | Merrill | 52—303 |
| 2,602,323 | 7/1952 | Leemhuis | 52—303 |
| 2,887,173 | 5/1959 | Boschi | 52—145 |
| 3,000,144 | 9/1961 | Kitson | 52—309 |
| 3,334,458 | 8/1967 | Leemhuis | 52—303 |
| 3,352,079 | 11/1967 | Strong | 52—381 |

FOREIGN PATENTS

| | | |
|---|---|---|
| 638,728 | 1962 | Canada. |
| 1,033,063 | 1966 | Great Britain. |
| 135,097 | 1961 | U.S.S.R. |

HENRY C. SUTHERLAND, Primary Examiner

U.S. Cl. X.R.

52—220, 309, 495